US011410005B2

(12) United States Patent
Shaw et al.

(10) Patent No.: US 11,410,005 B2
(45) Date of Patent: Aug. 9, 2022

(54) COVERT DOT PATTERNS

(71) Applicant: Hewlett-Packard Development Company, L.P., Spring, TX (US)

(72) Inventors: Mark Shaw, Boise, ID (US); Bradley R Larson, Boise, ID (US)

(73) Assignee: Hewlett-Packard Development Company, L.P., Spring, TX (US)

(*) Notice: Subject to any disclaimer, the term of this patent is extended or adjusted under 35 U.S.C. 154(b) by 57 days.

(21) Appl. No.: 17/048,031

(22) PCT Filed: Aug. 1, 2018

(86) PCT No.: PCT/US2018/044777
§ 371 (c)(1),
(2) Date: Oct. 15, 2020

(87) PCT Pub. No.: WO2020/027825
PCT Pub. Date: Feb. 6, 2020

(65) Prior Publication Data
US 2021/0374492 A1   Dec. 2, 2021

(51) Int. Cl.
*G06F 15/00* (2006.01)
*G06K 1/00* (2006.01)
*H04N 1/60* (2006.01)
*G06K 15/02* (2006.01)

(52) U.S. Cl.
CPC ..... *G06K 15/1813* (2013.01); *G06K 15/1822* (2013.01); *G06K 15/1878* (2013.01)

(58) Field of Classification Search
CPC .......... G06K 15/1813; G06K 15/1822; G06K 15/1878
See application file for complete search history.

(56) References Cited

U.S. PATENT DOCUMENTS

| 5,704,021 | A |   | 12/1997 | Smith et al. |
| 6,049,627 | A | * | 4/2000 | Becker ................... G06T 1/005 |
| | | | | 713/176 |
| 6,700,995 | B2 |   | 3/2004 | Reed |
| 6,763,124 | B2 |   | 7/2004 | Alattar et al. |
| 7,063,264 | B2 |   | 6/2006 | Bi et al. |
| 7,246,868 | B2 |   | 7/2007 | Walmsley |
| 7,554,699 | B2 |   | 6/2009 | Wang et al. |
| 7,586,500 | B2 |   | 9/2009 | Herceg et al. |

(Continued)

FOREIGN PATENT DOCUMENTS

CN  1118898 A   3/1996
CN  1445711 A   10/2003
(Continued)

*Primary Examiner* — Moustapha Diaby
(74) *Attorney, Agent, or Firm* — HP Inc. Patent Department

(57) ABSTRACT

Examples described herein relate to a system consistent with the disclosure. For instance, the system may comprise a printing device including hardware to form markings on a print medium, a memory resource, and a controller to receive a print job to form the markings on the print medium, render a page description language of the print job to form the markings, determine an object type image of the print job, designate pixels of the determined object type image to form a covert dot pattern on the image, and adjust colors of the designated pixels to form the covert dot pattern on the markings.

15 Claims, 5 Drawing Sheets

(56) References Cited

U.S. PATENT DOCUMENTS

| | | |
|---|---|---|
| 7,755,629 B2 | 7/2010 | Smith |
| 8,064,102 B1 | 11/2011 | Zhao et al. |
| 8,144,368 B2 | 3/2012 | Rodriguez et al. |
| 8,526,725 B2 | 9/2013 | Nagao |
| 8,861,025 B2 | 10/2014 | Hoshino |
| 8,947,744 B2 | 2/2015 | Kurtz et al. |
| 9,256,816 B2 | 2/2016 | Miyanaga |
| 9,667,828 B2 | 5/2017 | Nakano et al. |
| 2006/0072778 A1 | 4/2006 | Harrington |
| 2006/0114481 A1* | 6/2006 | Moore ............... G06K 15/1822 358/1.11 |
| 2006/0230273 A1* | 10/2006 | Crichton ................ G03G 15/50 713/176 |
| 2007/0170250 A1 | 7/2007 | Bystrom et al. |
| 2009/0060261 A1 | 3/2009 | Wang |
| 2009/0129592 A1 | 5/2009 | Swiegers et al. |
| 2009/0134227 A1 | 5/2009 | Roth |
| 2010/0100505 A1* | 4/2010 | Campbell .......... G06Q 30/0283 358/1.9 |
| 2010/0128290 A1 | 5/2010 | Fan |
| 2010/0128320 A1 | 5/2010 | Fan |
| 2013/0323476 A1 | 12/2013 | Farrell et al. |
| 2014/0132694 A1 | 5/2014 | Shacham et al. |
| 2016/0318310 A1 | 11/2016 | Song et al. |

FOREIGN PATENT DOCUMENTS

| | | |
|---|---|---|
| CN | 1604137 A | 4/2005 |
| CN | 101336440 A | 12/2008 |
| CN | 101918224 A | 12/2010 |
| CN | 103718189 A | 4/2014 |
| CN | 107428187 A | 12/2017 |
| EP | 0556321 A1 | 8/1993 |
| EP | 2739785 B1 | 4/2016 |
| JP | 2000-092308 A | 3/2000 |
| JP | 2005-039448 A | 2/2005 |
| JP | 2013-070221 A | 4/2013 |
| RU | 2304808 C1 | 8/2007 |
| WO | WO-2005025201 A3 | 6/2005 |

* cited by examiner

COVERT DOT PATTERNS

BACKGROUND

Imaging systems such as printers, copiers, etc. may be used to form markings on a print medium, such as text, images, etc. Imaging systems may form markings on the print medium and/or form a three-dimensional object by employing a print substance such as an ink, toner, and/or a three-dimensional printing substance such as three-dimensional printing powders, etc.

DETAILED DESCRIPTION

Printing devices may form markings on a print medium (e.g., paper, photopolymers, plastics, composite, metal, wood, etc.) by transferring a print substance (e.g., ink, toner, etc.) to print medium. The printing devices may render the page description language of a print job to form markings on print medium. In addition, the printing devices may form additional and/or covert markings on print media while forming markings such as physical representation of text, images, models, etc. on print medium. As used herein, "printing device" refers to a hardware device with functionalities to physically produce representation(s) of text, images, models, etc. on a physical print medium and/or produce a three-dimensional object. Examples of printing devices may include printing devices such as ink/toner printers and/or three-dimensional printers, among other types of printing devices.

Printing devices may transfer additional and/or covert marking not rendered by the page description language on print medium during a printing process. Further, printing devices may render the page description language, the object type image, and the RGB data of a print job. Some printing devices are ready to print an image when the RGB data is rendered. In addition, some printing devices examine the print ready RGB data to modify the print ready RGB data to form additional and/or covert markings on print medium. However, modifying the print ready RGB data to form additional and/or covert markings may adversely affect the page per minute rate of the printing device. In addition, modifying the print ready RGB data to form additional and/or covert markings may negatively impact the print rendering performance (e.g., increase the time of the rendering process).

As such, covert dot patterns, as described herein, are formed on both image and non-image portions of print medium without modifying the print ready RGB data thereby not impacting the page per minute rate. Accordingly, this disclosure describes covert dot patterns that are produced by rendering the page description language of the print job, determining the object type image of the print job, and designating pixels to form a covert dot pattern based on the object type image.

Figure 1:
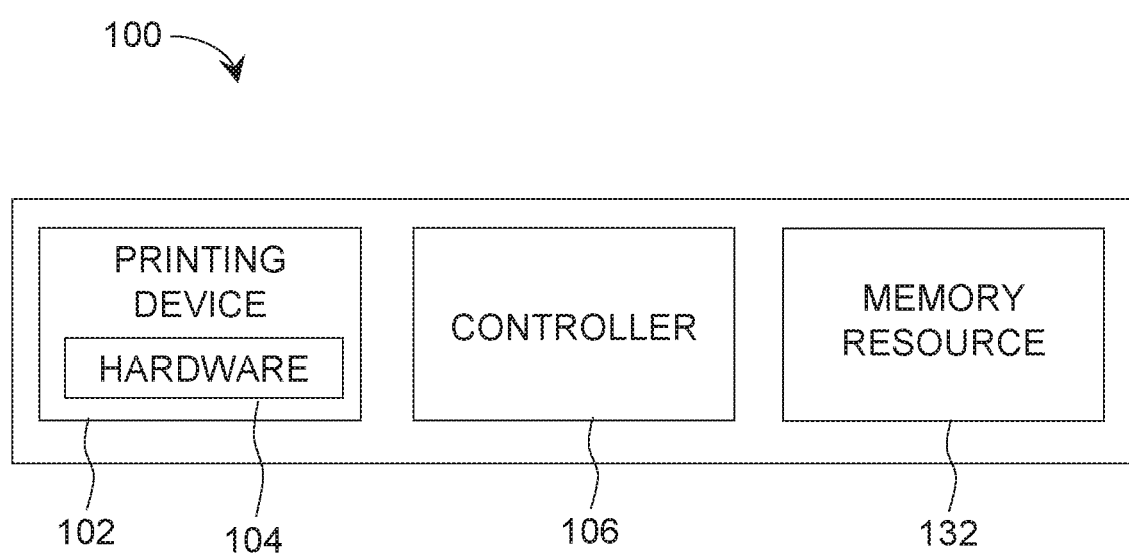
FIG. 1 illustrates an example of a system consistent with the disclosure.

FIG. 1 illustrates an example of a system 100 consistent with the disclosure. The system 100 may be implemented in a variety of imaging systems, such as printers, copiers, etc., for example. In some examples, the system 100 may include a printing device 102 including hardware 104 to form markings and/or representation(s) on print medium. The printing device 102 may utilize the hardware 104 to deposit print substance on print medium to form markings and/or physical representations on the print medium. As used herein "print medium" refers to an individual paper, photopolymer, plastic, composite, metal, wood, or other material on which markings may be formed to make up a physical representation of the output of a print job or a portion of an output of a print job. As used herein, "print job" refers to signals or states, which may be stored in a file and/or a set of files, usable to instruct a printing device in forming markings such as text, images, etc. on print media and/or objects such as three-dimensional object.

In some examples, the system 100 may include a memory resource 132 to store information. The memory resource 132 may store a color conversion table for the system 100. In some examples, the color conversion table stored in the memory device 132 may assist the printing device 102 in forming covert dot patterns on print medium. In some examples, covert dot patterns are formed by converting existing pixel color to a different color based on the information in a color conversion table. Each pixel used to form the markings and/or representation(s) may have a color value. The color value may be used to determine a corresponding color in the color conversion table for a designated pixel. In some examples, the color of the covert dot patterns may be determined by inputting the color value of a designated pixel into an algorithm. In some examples, the color conversion table may include information, such as an algorithm, to convert the color of a designated pixel. That is, the color value of the pixel is inputted into the color conversion table and the new color of the pixel is determined based on the output value of the color conversion table.

In some examples, the system 100 may include a controller 106. The controller 106 may receive a print job to form markings and/or representation(s) on print medium. The controller 106 may cause the hardware 104 included in the printing device 102 to form covert dot patterns while forming markings and/or representation(s) on print medium. As used herein, "covert dot patterns" refers to a pattern of dots throughout a sheet of print medium that is not easily detected by an unaided human eye. That is, the controller 106 may alter the markings and/or representation(s) of the print job to include covert dot patterns. For examples, the color of a select group of pixels of the markings and/or representation(s) may be altered and/or changed to create the covert dot pattern. In some examples, the covert dot patterns included in the markings and/or representation(s) may not be easily detected with an unaided human eye.

In some examples, the controller 106 may render the page description language of the print job to form markings and/or representation(s) on print medium. In some examples, a page description language of the print job may be rendered before the printing device 102 forms markings and/or representation(s) on print medium. The page description language may specify the arrangement of a printed page through commands from a computing device. As used herein, "page description language" refers to a computer language that describes the appearance of the markings and/or representation(s) formed on the print medium. In some examples, the controller 106 rendering the page description language of the print medium may assist the printing device in forming markings and/or physical representations on the print medium. The controller 106 may perform an individual rendering of the page description language per print job.

In some examples, the controller 106 may determine the object type image of the markings and/or representation(s) that may be printed on the print medium. In some examples, the controller 106 may determine the object type image for each print medium of the print job. The controller 106 may determine the object type image once for the entire print job. In some examples, the controller 106 may determine the object type image for the print job after the page description language is rendered. That is, the controller 106 may utilize the rendered page description language to determine the object type image of the print job. As used herein, "object type image" refers to the description of a pixel that states what type of markings the pixels making up the markings will produce. For example, the pixel may be used to create a communicative text, a vector, and/or a raster content, among other possibilities. In some examples, once the object type image is determined for the print job pixels that form the markings may be designated to create a covert dot pattern.

For example, the controller 106 may designate certain pixels of the determined object type image to form a covert dot pattern on the markings and/or representation(s). For instance, the controller 106 may specify which pixels of the markings and/or representation(s) will create the covert dot pattern, thereby producing a unique pattern. In addition, the controller 106 may determine the unique portion of the covert dot pattern one time per the entire print job to increase the performance of the printing process. In some examples, the controller 106 may designate pixels to form a covert dot pattern before the RGB data is rendered. That is, determining the covert dot pattern before the RGB data is rendered may allow for a faster printing process as compared to determining the covert dot pattern after the RGB data is rendered. As used herein, "printing process" refers to process of transferring print substance to a print medium and/or forming a three-dimensional object using three-dimensional printing substance.

In some examples, the controller 106 may store the information from the designated pixels on the memory resource 132 to recreate the covert dot pattern. For instance, the controller 106 may cause hardware 104 to repeatedly embed and/or stamp the covert dot pattern into each sheet of print medium of the print job without any additional performance impact to the printing device 102. In some examples, the system 100 may use existing hardware 104 to embed the covert dot pattern into the markings and/or representation(s) printed on the print medium. As used herein, "designated pixel" refers to a particular pixel chosen and/or appointed by the controller.

In some examples, the controller 106 may adjust the colors of the designated pixels to form the covert dot pattern on the markings and/or representation(s) formed on the print medium. The designated pixels may be adjusted using the color conversion table stored on the memory resource 132. That is, the color conversion table may include information to adjust colors of the designated pixels based on the color value of the designated pixels.

For instance, each pixel of the designated pixels may include a color value that may be inputted into the color conversion table to determine the adjusted color of the pixel to form the covert dot pattern in the markings. In some examples, the controller 106 may adjust the colors of the designated pixels individually based on the color conversion table and an individual color value of each pixel of the designated pixels. The covert dot pattern may be embedded into the object type image so that the markings and/or representation(s) are printed with the covert dot pattern. As used herein, "adjusted color" refers to an altered or changed color.

Although controller 106 is illustrated in FIG. 1 as being included in system 100, examples of the disclosure are not so limited. For example, controller 106 may be remote from system 100 and/or printing device 102 and may communicate with system 100 and/or printing device 102 via a network relationship, such as a wired or wireless network.

Figure 2:
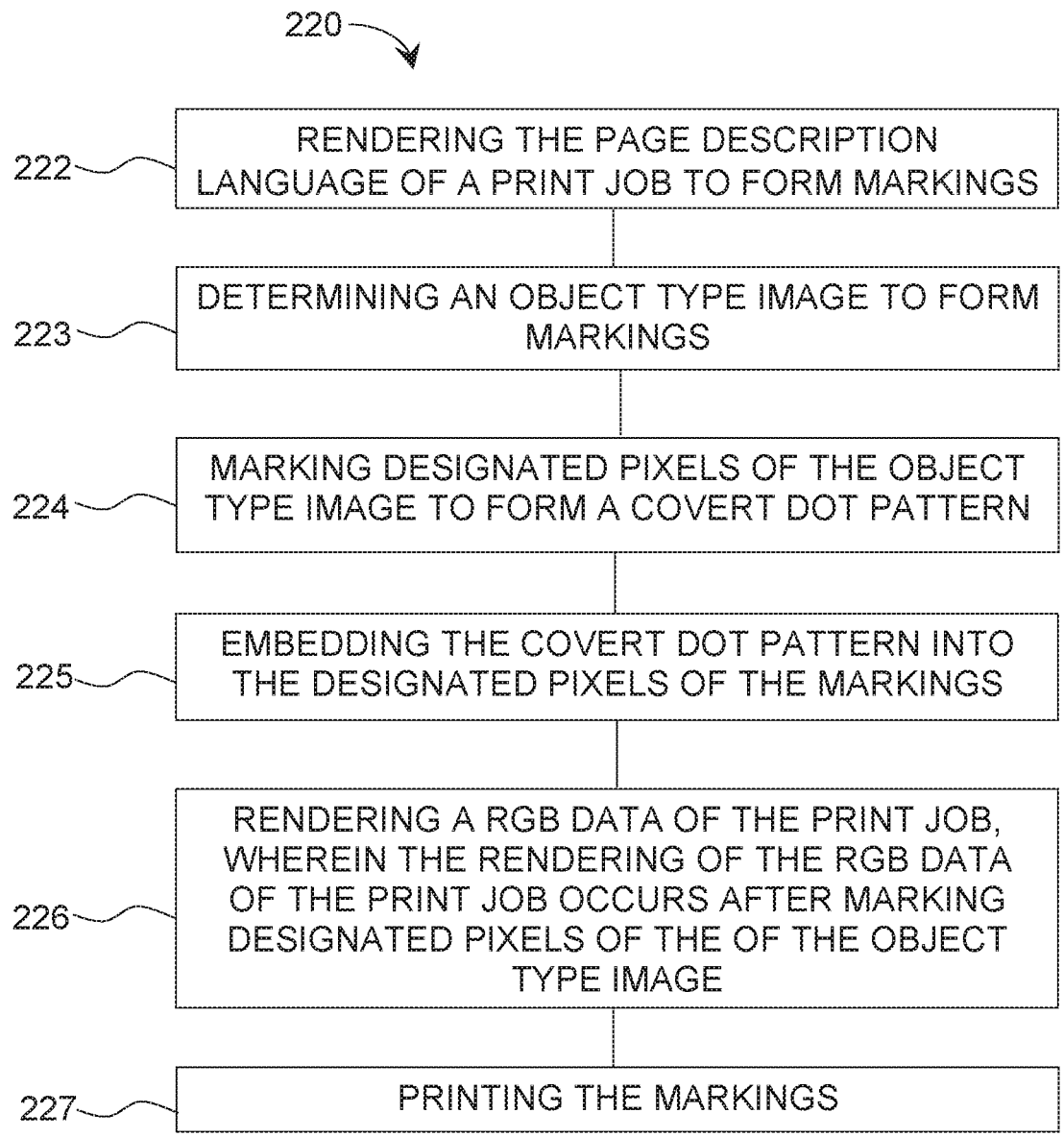
FIG. 2 illustrates an example of a method consistent with the disclosure.

FIG. 2 illustrates an example of a method 220 consistent with the disclosure. Method 220 may be performed, for example, by a controller (e.g., controller 106, described in FIG. 1) of a system (e.g., system 100, described in FIG. 1). In some examples, the method 220 may be performed with more or less elements.

At 222, the method 220 may include rendering, by a controller, the page description language of a print job to form markings. When a printing device receives a print job the hardware included in the printing device may create the covert dot patterns on the print medium. The pixels that form the markings and/or representation(s) may be altered to create the covert dot pattern. However, before the pixels that create the markings and/or representation(s) are altered the controller may render the page description language for the print job. That is, the controller may determine the arrangement of the objects that will be formed on the print medium. In some examples, the print job may render the page description language once during the entire print job. The rendered page description language may be used to determine the object type image of the markings and/or representation(s).

At 223, the method 220 may include determining, by the controller, an object type image to form markings. In some examples, the object type image may be determined after the page description language of the print job is rendered. In addition, the controller may determine the object type image based on the rendered page description language. With the object type image, the controller may be able to determine the color of the pixels that make up the markings and/or representation(s) and the type of markings that may be produced. That is, determining the object type image may determine if the markings and/or representation(s) include communicative text, vector, and/or raster content, amongst other possibilities. In addition, determining the object type image may determine the color of each individual pixel of the markings. In some examples, the object type may be determined once for a print job. That is, the controller may determine the object type for each print medium of the print job once for the entire print job.

At 224, the method 220 may include marking, by the controller, designated pixels of the object type image to form a covert dot pattern. In some examples, the controller may designate pixels of the object type image to form a covert dot pattern. That is, the controller may determine which pixels of the object type image will form the covert dot pattern by picking the pixels that will have an adjusted color. In some examples, the controller may determine the pixels to make up the covert dot pattern before the RGB data is rendered. In some examples, the controller may store the information to create the covert dot pattern in the memory resource (e.g., memory resource 132 of FIG. 1), The information stored on the memory resource may be used to create covert dot patterns on other sheets of print medium. In some examples, reusing the determined covert dot pattern may create a quick printing process.

At 225, the method 220 may include embedding, by the controller, the covert dot pattern into the designated pixels of the object type image. In some examples, the covert dot pattern is embedded into the object type image. That is, the value of the designated pixels are adjusted and/or changed to create the covert dot pattern in the markings and/or representation(s). For instance, designated pixels of the object type image may be adjusted to form the covert dot pattern. In addition, the designated pixels may be adjusted in a manner to produce a covert dot pattern that may not be readily detectable by the unaided human eye.

At 226, the method 220 may include rendering, by a controller, a RGB data of the print job, wherein the rendering of the RGB data of the print job occurs after marking designated pixels of the of the object type image. In some examples, the RGB data of the markings and/or representation(s) may be determined to produce the print job on print medium. However, the RGB data may be rendered after the designated pixels are marked to be adjusted. That is, the controller may designate pixels of the object type image to form a covert dot pattern before the RGB data of the markings and/or representation(s) are rendered. In various examples, the embedded covert dot pattern of the object type image may be rendered into the RGB data. In addition, in some examples, the embedded covert dot pattern may be rendered into the RGB data as the markings and/or representation(s) are printed.

In some examples, the controller may designate pixels of the object type image to form a covert dot pattern before the RGB data is converted to CYMK. In some examples, designating the pixels of the object type image to form the covert dot pattern before the RGB data is rendered may determine the location and color of the covert dot pattern without causing a significant impact to the performance of the printing device.

Figure 3:
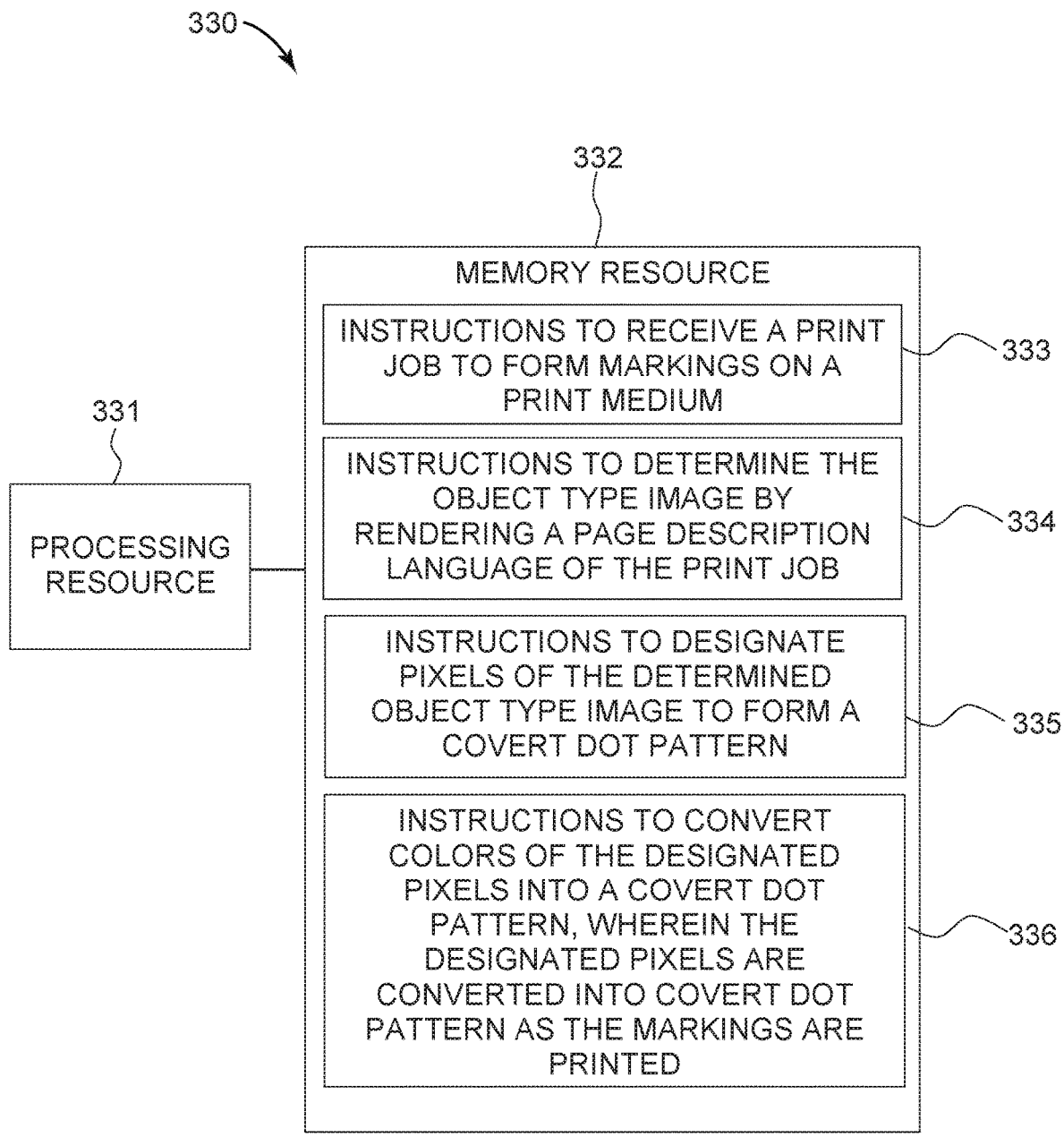
FIG. 3 illustrates an example of an apparatus suitable with a system consistent with the disclosure.

At 227, the method 220 may include printing, by the controller, the markings. In some examples, after the paged description language is rendered, the object type image is determined, and the controller has designated pixels to create the covert dot pattern the printing device may print the markings and/or representation(s) on a sheet of print medium. In addition, the controller may cause the printing device to print the markings and/or representation(s) on print medium as the embedded covert dot pattern is rendered into the RGB data, FIG. 3 illustrates an example of an apparatus 330 suitable with a system consistent with the disclosure. As illustrated in FIG. 3, the apparatus 330 includes a processing resource 331 and a memory resource 332. The processing resource 331 may be a hardware processing unit such as a microprocessor, application specific instruction set processor, coprocessor, network processor, or similar hardware circuitry that may cause machine-readable instructions to be executed. In some examples, the processing resource 331 may be a plurality of hardware processing units that may cause machine-readable instructions to be executed. The processing resource 331 may include central processing units (CPUs) among other types of processing units. The processing resource 331 may also include dedicated circuits and/or state machines, such as in an Application Specific Integrated Circuit (ASIC), Field Programmable Gate Array (FPGA) or similar design-specific hardware. The memory resource 332 may be any type of volatile or non-volatile memory or storage, such as random-access memory (RAM), flash memory, read-only memory (ROM), storage volumes, a hard disk, or a combination thereof.

The memory resource 332 may store instructions thereon, such as instructions 333, 334, 335, and 336. When executed by the processing resource 331, the instructions may cause the apparatus 330 to perform specific tasks and/or functions. For example, the memory resource 332 may store instructions 333 which may be executed by the processing resource 331 to cause the apparatus 330 to receive a print job to form markings and/or representation(s) on a print medium. In some examples, a controller may receive a print job containing information about the markings and/or representation(s) that are to be formed on print medium. In some examples, the print job information may inform the controller of the type of markings and/or representation(s) that are to be produced, the color of the pixels that will make up the markings and/or representation(s), and how many sheets of print medium will create the markings and/or representation(s), amongst other possibilities, That is, the controller may receive information to create the markings and/or representation(s) when the controller receives the print job.

The memory resource 332 may store instructions 334 which may be executed by the processing resource 331 to determine the object type image by rendering a page description language of the print job. In some examples, when the page description language of a print job is rendered the object type image may be determined. The object type image may include information as to the type of markings and/or representation(s) the printing device is to produce. In some examples, the controller may render the page description language for a print job once. In addition, the object type image for the print job may be determined once for the print job. In some examples, the color of the pixels may be determined when the object type image is determined.

The memory resource 332 may store instructions 335 which may be executed by the processing resource 331 to designate pixels of the determined object type image to form a covert dot pattern. In some examples, determining the object type image may allow the controller to determine the pixels that will have an adjusted color. For instance, to form a covert dot pattern the controller may use the color information in the object type imaged to determine which pixels while receive the adjusted color. This may allow the adjusted color of the pixels by an algorithm of the color conversion table. In some examples, the controller may individually determine the adjusted color of the designated pixels when determining the pixels to form the covert dot pattern using the algorithm of the color conversion table.

The memory resource 332 may store instructions 336 which may be executed by the processing resource 331 to convert colors of the designated pixels into a covert dot pattern, wherein the designated pixels are converted into covert dot pattern as the markings and/or representation(s) are printed. In some examples, the designated pixels may be converted into the covert dot pattern by adjusting colors of the designated pixels. That is, the color of the designated pixels may be adjusted to produce a covert dot pattern. The colors of the designated pixels may be adjusted as the printing device prints markings on the print medium. In some examples, the adjusted color of the designated pixel may not be detected by an unaided human eye when next to other pixels. In addition, the controller may determine the adjusted color of the designated pixel based on the colors that surround the pixel.

Figure 4:
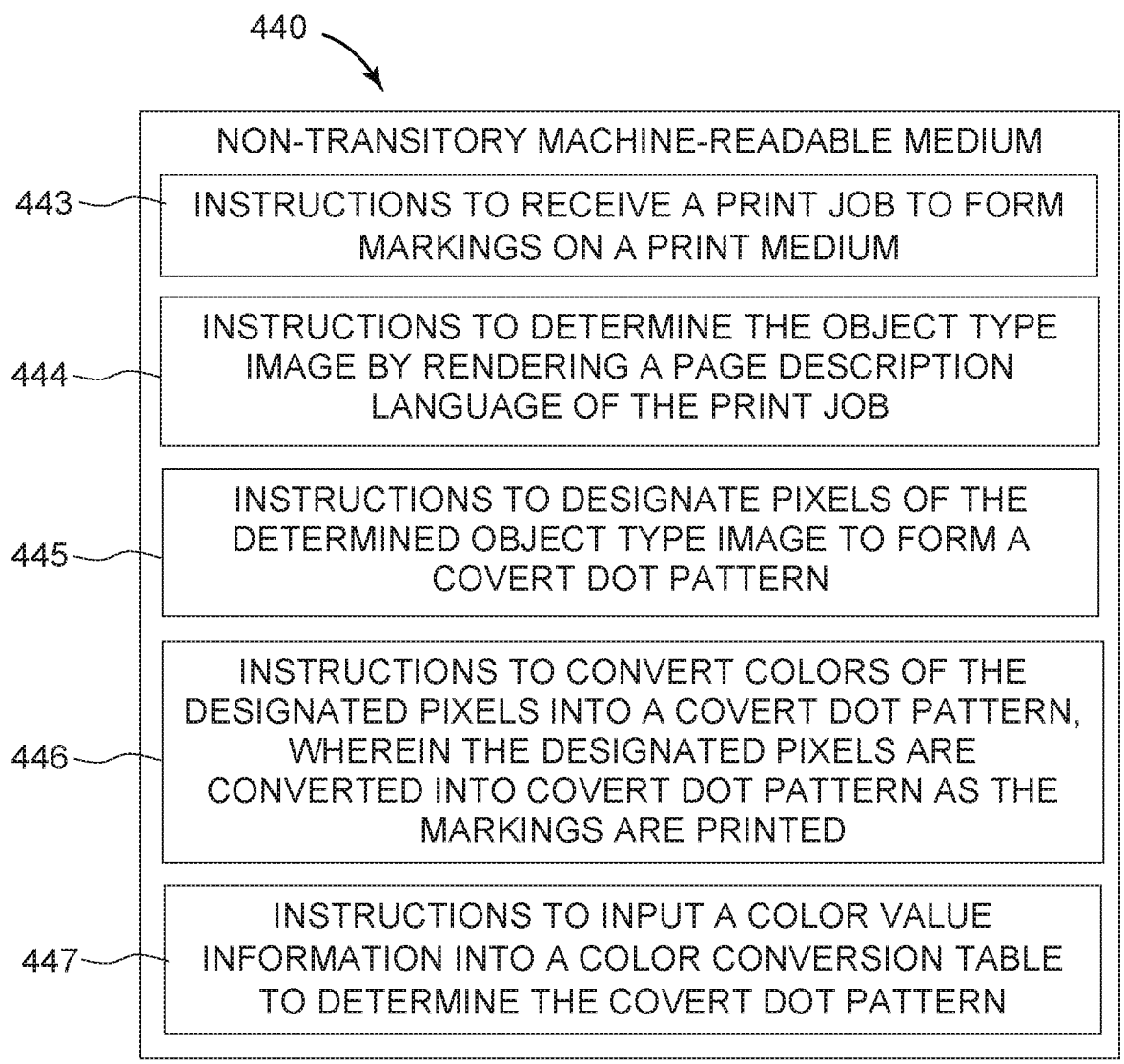
FIG. 4 illustrates an example diagram of a non-transitory machine readable medium suitable with a system consistent with the disclosure.

FIG. 4 illustrates an example diagram of a non-transitory machine readable medium 440 suitable with a system consistent with the disclosure. The non-transitory machine-readable medium 440 may be any type of volatile or non-volatile memory or storage, such as random-access memory (RAM), flash memory, read-only memory (ROM), storage volumes, a hard disk, or a combination thereof.

The medium 440 stores instructions 443 executable by a processing resource to receive a print job to form markings on a print medium. The information from the print job may provide usable instruction for forming the markings and/or representation(s) on print medium. Receiving the print job may allow the printing device to create the markings and/or representation(s). In some examples, the markings and/or representation(s) of the print job may be altered to form covert markings on the print medium. In addition, a human eye may not be able to detect the altered pixels without assistance from a device and/or magnifying the print medium.

The medium 440 stores instructions 444 executable by a processing resource to determine the object type image by rendering a page description language of the print job. In some examples, the page description language of the print job may be rendered to form markings and/or representation(s) on print medium. The page description language of the print job may be rendered before the printing device forms markings and/or representation(s) on the print medium. In addition, the controller may determine the object type image for the print job after the page description language is rendered. In some examples, pixels may be designated to create a covert dot pattern once the object type image is determined. In some examples, the object type image may be determined before the RGB data is rendered.

The medium 440 stores instructions 445 executable by a processing resource to designate pixels of the determined object type image to form a covert dot pattern. In some examples, pixels of the object type image may be used to make up the covert dot pattern. All of the pixels of the object type image may not be used to form the covert dot pattern.

The medium 440 stores instructions 446 executable by a processing resource to convert colors of the designated pixels into a covert dot pattern, wherein the designated pixels are converted into covert dot pattern as the markings and/or representation(s) are printed. The controller may convert the designated pixel by adjusting the color of pixel and embedding the adjusted color into the object type image. Adjusting the color of the object type image may create a covert dot pattern. In some examples, the embedded covert dot pattern may be printed into the markings and/or representation(s) as the RGB data is rendered.

The medium 440 stores instructions 447 executable by a processing resource to input a color value information into a color conversion table to determine the covert dot pattern. The pixels of the markings and/or representation(s) may include a color value. The color value may assist in adjusting the color of the designated pixel. That is, the color value and the color conversion table may be used to determine the adjusted color of the designated pixels. For instance, the color value may be inputted into the color conversion table and the adjusted color of the designated pixel may be determined based on the output value of the color conversion table.

Figure 5:
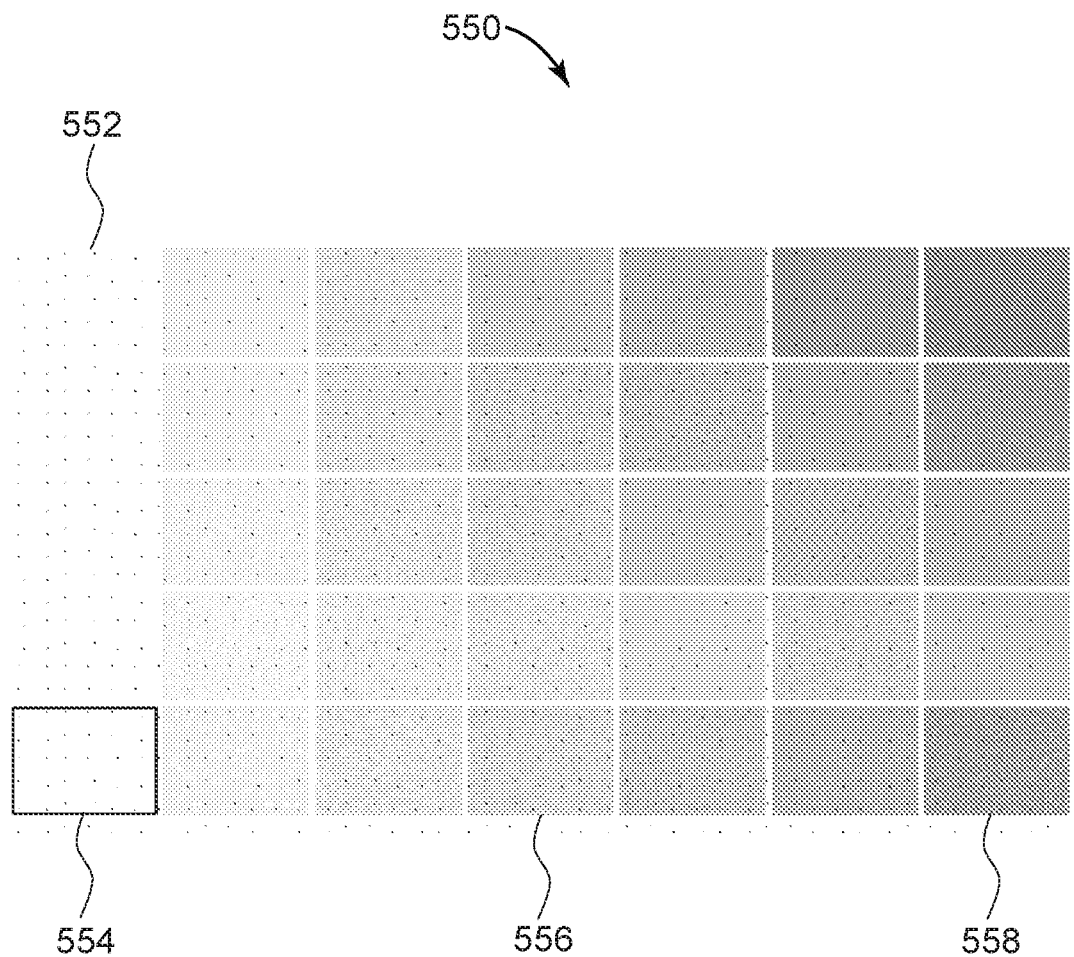
FIG. 5 illustrates an example of a covert dot pattern consistent with the disclosure.

FIG. 5 illustrates an example of a covert dot pattern 550 consistent with the disclosure. The covert dot pattern 550 illustrated in FIG. 5 has been modified and enlarged for the purpose of this disclosure and ease of visibility to the unaided human eye. While FIG. 5 is illustrated in black and white it is to be understood that the covert dot pattern and the markings and/or representation(s) may be produced in a variety of colors. In some examples, covert dot pattern 550 may be embedded in markings and/or representation(s) formed on print medium. The covert dot patterns 550 may be produced with different intensity levels and in different colors to produce a plurality of dots 552, in the markings and/or representation(s) formed on print medium, that may not be readily detectable by the unaided human eye.

In some examples, the covert dot pattern 550 may be formed by adjusting the colors of designated pixels of the object type image. Adjusting the color and intensity level of the designated pixels based on the surrounding colors of the designated pixels may produce a dot pattern that may not be readily detectable by the unaided human eye. That is, the colors and intensity levels of the covert dot pattern 550 may be based on the colors that surround the plurality of dots 552 that makes up the covert dot pattern 550. In some examples, having the colors and intensity levels of the plurality of dots 552 based on the colors that surround the plurality of dots 552 may allow each dot of the covert dot pattern 550 to have a unique intensity level and color. As used herein, "intensity level" refers to the amount of print substance used to produce a particular brightness in a region of print medium to create markings on the print medium and dots of the covert dot pattern. In some examples, the colors and intensity levels of the covert dot pattern 550 may be adjusted in a manner that allows for a machine and/or computing device to easily detect the covert dot pattern.

For instance, the dots of the covert dot pattern 550 in block 554 may be lighter and less intense than the dots of the covert dot pattern 550 in blocks 556 and 558. That is, the dots in block 554 may be surrounded by a lighter color as compared to the dots in blocks 556 and 558, thereby producing a lighter less intense dot of the covert dot pattern 550 in comparison. In addition, the dots of the covert dot pattern 550 in block 556 may be lighter and less intense than the dots of the covert dot pattern 550 in block 558, but darker and more intense than the dots of the covert dot pattern 550 in block 554. That is, the dots in block 556 may be surrounded by a lighter color as compared to the dots in blocks 558 thereby producing lighter less intense dots of the covert dot pattern 550 in comparison.

In contrast, the dots in block 556 may be surrounded by a darker color as compared to the dots in blocks 554, thereby producing darker more intense dots of the covert dot pattern 550 in comparison. Further, the dots of the covert dot pattern 550 in block 558 may be darker and more intense than the dots of the covert dot pattern 550 in blocks 554 and 556. That is, the dots in block 558 may be surrounded by a darker color as compared to the dots in blocks 554 and 556, thereby producing darker more intense dots of the covert dot pattern 550 in comparison.

In some examples, the covert dot pattern 550 may produce an intensity level that is opposite the intensity level of the colors surrounding it. For example, the dots in the covert dot pattern 550 may be surrounded by a darker color as compared to the dots in blocks 554 and 556, but the dots in the covert dot pattern 550 may be a lighter less intense than the surrounding colors and the dots in blocks 554 and 556.

In some examples, the intensity levels and color of the covert dot pattern 550 may vary depending on the colors that surround the dot the overall appearance of the covert dot pattern 550 may be uniformed. That is, the plurality of dots 552 of the covert dot pattern 552 may appear to have a uniformed intensity level and/or color.

The figures herein follow a numbering convention in which the first digit corresponds to the drawing figure number and the remaining digits identify an element or component in the drawing. Elements shown in the various figures herein may be capable of being added, exchanged, and/or eliminated so as to provide a number of additional examples of the disclosure. In addition, the proportion and the relative scale of the elements provided in the figures are intended to illustrate the examples of the disclosure and should not be taken in a limiting sense.

It should be understood that the descriptions of various examples may not be drawn to scale and thus, the descriptions may have a different size and/or configuration other than as shown therein.

What is claimed:

1. A system comprising:
a printing device including hardware to form markings on a print medium;
a memory resource; and
a controller to:
receive a print job to form the markings on the print medium;
render a page description language of the print job to form the markings;
determine an object type image of the print job;
designate pixels of the determined object type image to form a covert dot pattern on the image; and
adjust colors of the designated pixels to form the covert dot pattern on the markings.

2. The system of claim 1, wherein the object type image is determined after the controller renders the page description language of the print job.

3. The system of claim 1, wherein each pixel of the designated pixels has a color value.

4. The system of claim 3, wherein the memory resource is to store a color conversion table, wherein the color conversion table includes information to adjust colors of the designated pixels based on the color value.

5. The system of claim 4, wherein the controller is to adjust the colors of the designated pixels individually based on the color conversion table and an individual color value of each pixel of the designated pixels.

6. The system of claim 1, wherein the covert dot pattern is embedded into the object type image.

7. The system of claim 1, wherein the object type image is comprised of communicative text, vector, raster content.

8. The system of claim 1, wherein the controller is to perform an individual rendering of the page description language of the print job before the covert dot pattern is formed.

9. A method comprising: rendering a page description language of a print job to form markings; determining an object type image to form markings, wherein the object type image is determined after the page description language of the print job is rendered; marking designated pixels of the object type image to form a covert dot pattern; and embedding the covert dot pattern into the designated pixels of the object type image.

10. The method of claim 9, further comprising rendering a RGB data of the print job, wherein the rendering of the RGB data of the print job occurs after marking designated pixels of the of the object type image.

11. The method of claim 9, further comprising printing the markings.

12. The method of claim 11, wherein printing the markings occurs at the same time as the embedded covert dot pattern is rendered into a RGB data.

13. A non-transitory machine-readable medium storing instructions executable by a processing resource to: receive a print job to form markings on a print medium; determine an object type image by rendering a page description language of the print job; designate pixels of the determined object type image to form a covert dot pattern; and convert colors of the designated pixels into a covert dot pattern, wherein the designated pixels are converted into covert dot pattern as the markings are printed.

14. The non-transitory machine-readable medium of claim 13, further including instructions to input a color value information into a color conversion table to determine the covert dot pattern.

15. The non-transitory machine-readable medium of claim 13, wherein the designated pixels are converted into the covert dot pattern by adjusting colors of the designated pixels.

* * * * *